United States Patent Office 3,580,803
Patented May 25, 1971

3,580,803
NUCLEAR REACTORS
Ivor Everson, Wantage, and Maurice William George, Swerford, England, assignors to United Kingdom Atomic Energy Authority, London, England
Filed Sept. 18, 1967, Ser. No. 668,393
Claims priority, application Great Britain, Sept. 21, 1966, 42,249/66
Int. Cl. G21c *19/10*
U.S. Cl. 176—28
8 Claims

ABSTRACT OF THE DISCLOSURE

A nuclear reactor comprising a plurality of nuclear fuel elements grouped to form a core assembly within a reactor vessel and means are provided to transfer the said core assembly between its reactor operating station and a second non-operating station within the said vessel.

BACKGROUND OF THE INVENTION

This invention relates to nuclear reactors and is particularly, but not exclusively, concerned with materials testing reactors.

It is conventional in the known materials testing reactors to handle fuel elements and vertical in-core experiments from above the reactor. The experimental equipment is therefore handled more frequently than is strictly necessary from an experimentor's point of view since, for example, such equipment must be unloaded to permit fuel changing. Experience indicates the undesirability of needless handling since delicate instrumented equipment is then more subject to the possibility of damage. This can have an adverse effect upon reactor utilisation particularly when complex experimental loops, rigs and irradiation devices are involved. Additionally, since it is present practice to change fuel elements individually, the time required to refuel a materials testing reactor tends to be prolonged and the reactor utilisation factor is correspondingly reduced.

It is therefore an object of the present invention to provide a new and improved form of nuclear reactor whereby the period of reactor shut down time required for fuel changing is minimised.

SUMMARY OF THE INVENTION

According to the invention a nuclear reactor comprises a plurality of nuclear fuel elements grouped to form a core assembly within a reactor vessel and means are provided to transfer the said core assembly between its reactor operating station and a second non-operating station within the said vessel.

The second station may provide a fuel element load and unload station for the core.

In a preferred form of the invention the core transfer means comprise a moveable member located within the reactor vessel, a core supporting means on said member whereby a core assembly may be moved between its reactor operating station and a storage and/or core assembly position.

The moveable member may comprise at least one arm capable of vertical and rotational movement. The arm is preferably horizontal and arranged to rotate in a horizontal plane such that a core assembly may be moved vertically from its reactor operating station and then moved in a horizontal plane to the storage and/or core assembly station.

According to a further feature of the invention the moveable member comprises a plurality of arms, each arm being arranged to support a core assembly such that movement of one assembly from the reactor operating station to a storage or core assembly station moves another core assembly to the reactor operation station.

The moveable member is preferably hollow to form a coolant duct to the core and valve means are provided to proportion the flow of coolant to the operative core and the core or cores on the other arms.

BRIEF DESCRIPTION OF THE DRAWINGS

To enable the nature of the invention to be more readily understood one embodiment of the invention will now be described, by way of example only, with reference to the accompanying diagrammatic drawing of a nuclear reactor. In the drawing

DESCRIPTION OF THE PREFERRED EMBODIMENT

Figure 1:
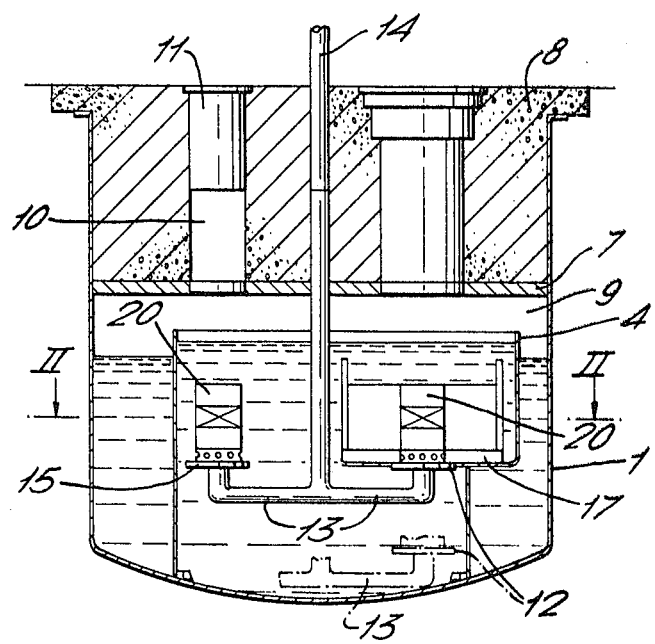
FIG. 1 is a mid-sectional elevation of the reactor vessel and FIG. 2 is a sectional plan on the line II—II of FIG. 1.
Figure 2:
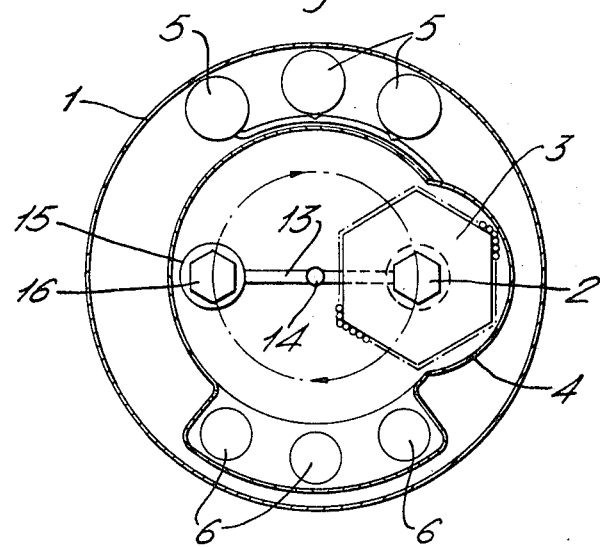

The drawing illustrates a high flux sodium cooled fast materials testing reactor intended primarily for the irradiation of small specimens under carefully controlled conditions in specially designed reactor loops and experimental rigs.

The reactor basically comprises a reactor vessel 1, a high flux core 2 located within an annular reflector 3 and means for supplying a liquid metal coolant to the core and the reflector.

The reactor vessel is sub-divided by a baffle wall 4 to form an internal dam around the core and reflector. Coolant pumps 5 located outside the wall 4 circulate coolant upwards through the core and reflector and through heat exchangers 6.

The upper end of the vessel is closed by a steel heat shield 7 and a biological shield 8 in the conventional manner. A blanket gas 9 fills the space above the liquid sodium coolant levels.

Access to the reactor vessel is provided through the shields 7 and 8 in the known manner such that experimental loops and rigs (not shown) may be passed vertically into the core. Fuel loading and unloading access is provided by a duct 10 closable by a known type of rotatable plug 11.

The fuel in the form of pellets is located within elongated metal sheaths forming fuel pins. The pins include axial reflector material 20 at each end and a number of pins are interconnected to form a core sub-assembly. The core assembly comprises a plurality of sub-assemblies and is formed such that any one sub-assembly can be easily removed or replaced.

The core assembly 2 is supported on a pan 12 provided at the end of one of a pair of horizontal arms 13 forming part of a rotatable transfer member 14. Member 14, located centrally in the reactor vessel is provided with a vertical stem or spindle which extends upwards through the shields 7 and 8 to a drive mechanism (not shown) arranged to move the member vertically and/or rotatively as required. The arms 13 are diametrically opposed such that when core assembly 2 is located within the reflector 3, i.e. at its reactor operation station, a pan 15 at the end of the other arm is positioned directly below the fuel loading and unloading duct 10. A second core assembly 16 supported on pan 15 may be described as occupying the fuel load/unloading or storage station.

The horizontal arms 13 are hollow and are connected to the pumps 5 by way of ducts (not shown) such that the arms 13 act as ducts for coolant supplied from the pumps 5 to the underside of the core assemblies 2 and 16. A fixed position valve (not shown) regulates the amount of coolant flowing through each core i.e. a large flow to the operative core assembly and a smaller flow to the core assembly at the other station. It will be appreciated that separate flow connections (not shown) are provided between the pumps 5 and a bottom header chamber 17 located below the reflector whereby a sodium coolant flow can be maintained through the reflector at all times and between the pumps 5 and heat exchangers 6.

The sequence of installing a core assembly is as follows. A new core is assembled on a core support pan located directly below the access duct 10. The transfer member 14 is lowered to the position shown in chain line FIG. 1 and rotated, the arms moving through 180° to bring the new core assembly directly beneath the central cavity in the reflector. The transfer member is now raised to position the core assembly within the reflector and the reactor started up. During normal reactor operation a second core is assembled on the core support pan now located beneath the duct 10.

After the desired irradiation period the transfer member 14 is lowered to withdraw the core from the reflector and achieve adequate sub-criticality for safety, the arms are rotated through 180° and the transfer member raised again to bring the new core assembly into the reflector. The reactor can now be restarted.

The irradiated core assembly is now positioned below the access duct and can be dismantled after a suitable decay interval i.e. approximately 25 days.

It will be understood that the reactor control absorbers (not shown) are vertical and operated from above the reactor and that only vertical experimental equipment is permitted inside the reactor vessel. The control rod mechanisms may be detached and the absorbers allowed to remain in the core assembly and reflector while the mechanisms are withdrawn upwards from the reactor. Core assembly change can thus be effected without disturbing experiments or controls.

The invention has been described in relation to a materials testing liquid metal cooled fast reactor but it will be appreciated that the invention is in no way limited to this type of reactor but may be applied to other forms and types of reactor. Additionally, variations in the number and configuration of arms provided on the core assembly transfer member are possible. For example a single arm may be associated with a number of core assembly and/or storage stations and means provided to transfer a core assembly between the arm and the stations. In alternative arrangements two or more arms can be operated independently or a multiplicity of arms fixed relative to each other can be used i.e. three radial arms at 120° spacing provide a fuel load/unload station, a storage station and a reactor operation station. The use of three equally spaced arms is advantageous in that upon withdrawal from the reflector an irradiated core assembly can be left to decay while a new third core is assembled, the second core assembly occupying the operating position in the reflector.

We claim:
1. A nuclear reactor comprising a reactor vessel; a nuclear fuel core; a first, operating, station located within said vessel and comprising reflector means comprising a fixed reflector having an aperture therein to render said nuclear fuel core inherently critical when the core is positioned within said aperture of said fixed reflector at said first operating station; a second, non-operating, station located within said vessel away from said reflector means at which said core is rendered inherently subcritical when positioned at said second, non-operating, station; core transfer means comprising a member located in said vessel positioned to receive said core and moveable to move said core to said first, operating station wherein said core is positioned within said aperture and surrounded by said fixed reflector to render the core inherently critical or to said second, non-operating, station in said vessel to render said core inherently subcritical.

2. A nuclear reactor comprising a reactor vessel; first and second nuclear fuel cores; a first, operating station located within said vessel and comprising reflector means comprising a fixed reflector having an aperture therein to render a nuclear fuel core inherently critical when that core is positioned within said aperture of said fixed reflector at said first operating station; a second, non-operating, station located within said vessel away from said reflector means at which a core is rendered inherently subcritical when positioned at said second, non-operating, station; and core transfer means comprising a member located in said vessel positioned to receive two or more cores and moveable to move simultaneously said first core from said first, operating, station wherein said first core is positioned within and surrounded by said fixed reflector to said second, non-operating, station to render said first core inherently subcritical and said second core from said second, non-operating, station, to said first, operating, station to render said second core inherently critical.

3. A nuclear reactor according to claim 1 wherein the second station provides a fuel element load and unload station for the core.

4. A nuclear reactor according to claim 1 wherein the moveable member comprises at least one arm capable of vertical and rotational movement.

5. A nuclear reactor according to claim 4 wherein the arm is horizontal and arranged to rotate in a horizontal plane such that a complete core is moveable vertically from its first operating station and in a horizontal plane to the said second station.

6. A nuclear reactor according to claim 1 wherein the moveable member comprises a plurality of arms, each arm being arranged to support a complete core such that movement of one complete core from the reactor operating station to the non-operating station moves another complete core to the reactor operation station.

7. A nuclear reactor according to claim 1 wherein said vessel contains a coolant which submerges the core and the reflector.

8. A nuclear reactor according to claim 1 wherein said vessel is provided with first and second closeable access openings in a wall thereof, said first access opening communicating with said non-operating station to provide an opening through which said core is assembled or disassembled, and said second access opening communicating with said reactor operating station to provide an opening through which the said core is accessible when in the reactor operating station.

References Cited
UNITED STATES PATENTS

| | | | |
|---|---|---|---|
| 3,042,601 | 7/1962 | Loeb | 176—62 |
| 3,156,624 | 11/1964 | Clifford et al. | 176—18 |
| 3,308,030 | 3/1967 | Tadashi Aizu et al. | 176—62 |
| 3,344,032 | 9/1967 | Vendryes et al. | 176—18 |

CARL D. QUARFORTH, Primary Examiner

H. E. BEHREND, Assistant Examiner

U.S. Cl. X.R.

176—62